United States Patent
Hartmann et al.

[11] Patent Number: 5,977,665
[45] Date of Patent: Nov. 2, 1999

[54] LOW-NOISE ELECTRIC MOTOR IN PARTICULAR FOR DRIVING A MOTOR VEHICLE FAN

[75] Inventors: Uwe Hartmann, Wenkheim; Ralf Berg, Wuerzburg, both of Germany

[73] Assignee: Siemens Aktiengesellschaft, Munich, Germany

[21] Appl. No.: 09/012,220

[22] Filed: Jan. 23, 1998

[30]     Foreign Application Priority Data

Jan. 24, 1997 [EP] European Pat. Off. .............. 97101142

[51] Int. Cl.⁶ .............................. H02K 5/24; H02K 5/15; H02K 5/00
[52] U.S. Cl. ................... 310/51; 310/89; 310/90
[58] Field of Search ................... 310/51, 89, 90

[56]         References Cited

U.S. PATENT DOCUMENTS 5,497,039  3/1996  Blaettner .................................. 310/51

FOREIGN PATENT DOCUMENTS

| 0712195 | 5/1996 | European Pat. Off. . |
| 1320919 | 6/1963 | France . |
| 3707600 | 9/1988 | Germany . |
| 29508398 | 8/1996 | Germany . |
| 19523123 | 1/1997 | Germany . |
| 939508 | 10/1963 | United Kingdom . |
| WO-9637032 | 11/1996 | WIPO . |

*Primary Examiner*—Clayton LaBalle
*Attorney, Agent, or Firm*—Sughrue, Mion, Zinn, Macpeak & Seas, PLLC

[57]              ABSTRACT

To prevent noise being transmitted from a rotor portion of an electric motor (2–2.3) through the bearing brackets (3) to the motor's housing (1), each bearing bracket (3) is fixed relative to the motor housing (1) by at least one mounting part (5), with a noise damping part (4) arranged in between the bearing bracket (3) and the motor housing (1). The mounting part (5) rests directly against the motor housing (1) in the region where the mounting part (5) is coupled to the motor housing (1), without any noise damping part interposed between the mounting part (5) and the motor housing (1).

17 Claims, 5 Drawing Sheets

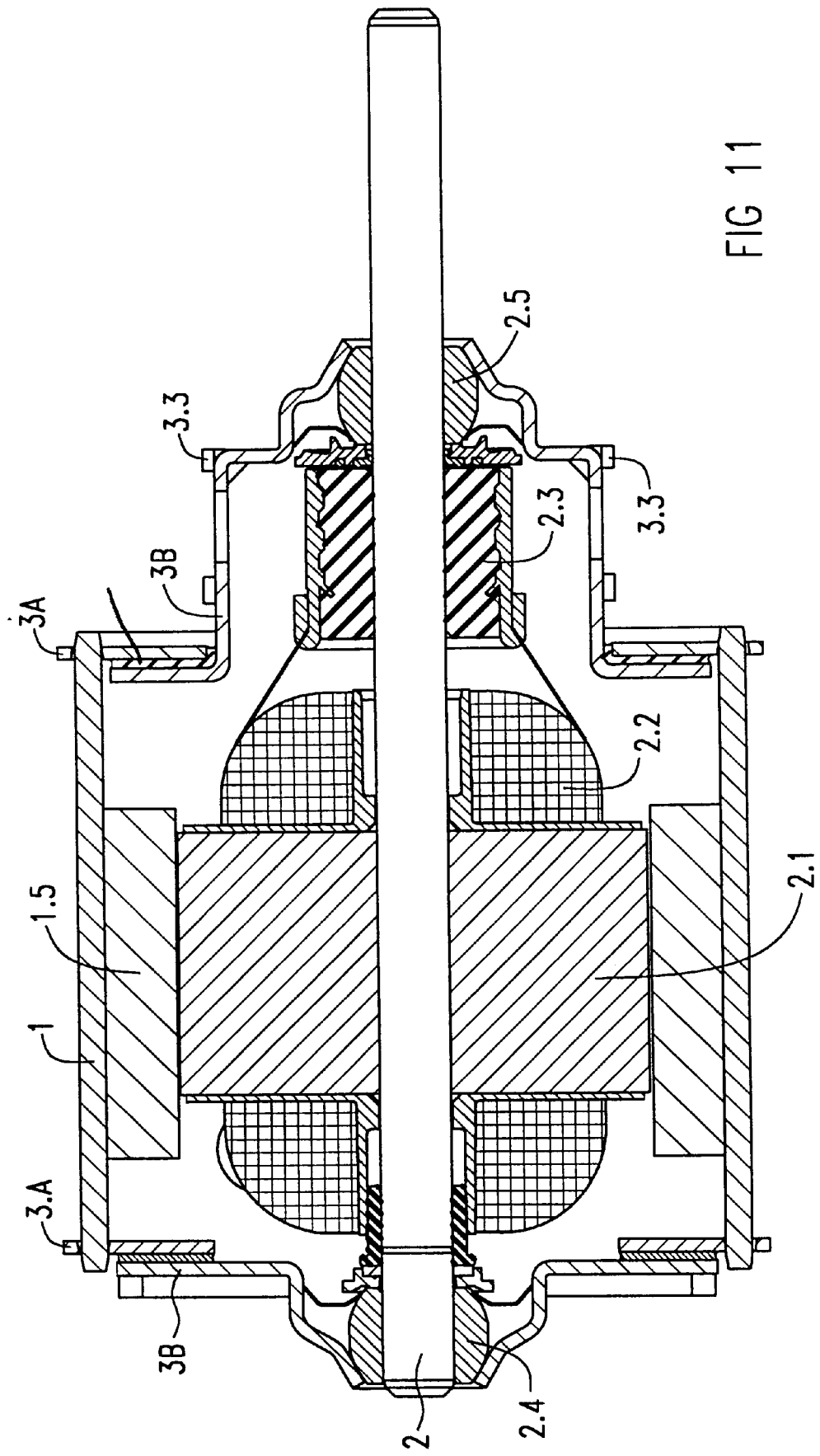

LOW-NOISE ELECTRIC MOTOR IN PARTICULAR FOR DRIVING A MOTOR VEHICLE FAN

The following disclosure is based on European Patent Application No. 97101142.4, filed on Jan. 24, 1997.

FIELD OF AND BACKGROUND OF THE INVENTION

The invention relates to new and useful improvements in low-noise electric motors. More particularly, the invention relates to a low-noise electric motors with at least one noise damping part interposed between the motor's housing and a bearing holder supporting the motor's bearing.

German Laid Open Publication 37 07 600 A1 discloses a low-noise pump drive in which the bearings are all arranged in a bearing holder made of elastic material, to avoid noise being transmitted from the rotor through the bearing holder to the motor housing. The bearing holders for the roller bearing, according to this conventional art, are designed as elastic rings. These each carry the bearing on an interior ring surface and press with their exterior surface against an end wall, which forms part of the motor housing.

German Utility Model 295 08 398 discloses a low-noise electric motor which has bearing brackets which are divided into two parts to avoid noise being transmitted from the rotor through the bearing brackets to the motor housing. These bearing brackets have a first bearing bracket part on the stator side, a second bearing bracket part on the bearing holder side and a damping part that connects the two bearing bracket parts. Ideally, the noise damping part is made of an elastomer, particularly a natural rubber, a silicone or an ethylene polymer.

OBJECTS OF THE INVENTION

It is an object of the invention to provide a low-noise electric motor which suppresses noise transmission from the rotor side to the stator and the motor housing, as well as to any item in which the motor housing is mounted, e.g., a fan unit in a vehicle. It is noted in this regard that the noise on the rotor side is caused especially magnetically and, in a commutator motor, by the noise made by the brushes sliding on the commutator. It is a further object that the design should be simple to manufacture in large-scale production, particularly using industrial robots.

SUMMARY OF THE INVENTION

According to one formuation of the invention, a low-noise electric motor is provided that includes:
 a motor housing;
 at least one bearing holder mounted on the motor housing;
 a noise damping part interposed between the motor housing and the bearing holder in a region in which the bearing holder is mounted to the motor housing; and
 at least one mounting part that fixes the bearing holder on the motor housing via the noise damping part. The mounting part is connected in direct contact to the motor housing.

The solution according to the invention allows conventional bearings and bearing holders, particularly bearing brackets, to be used in an advantageous manner while ensuring that noise is dampened. The invention further permits the bearing holders to be mounted on the motor housing on the stator side in a simple manner, using the mounting parts according to the invention, but without any risk of unwanted alignment errors. In addition, since the noise damping parts are not arranged in close proximity to the bearings, the noise damping parts are subject to less thermal stress. Since they preferably surround the retaining parts of the bearing holders with contact pressure being provided by the mounting part, this ensures that the entire bearing retaining system is very stiff, while at the same time providing noise insulation.

To simplify manufacture and assembly further, and provide a unit which can be fitted in only one step, the noise damping part and, if desired, the mounting part as well, are premounted on the retaining part of the bearing holder. To do this, the damping part is advantageously designed in the form of a pocket, which is plugged onto retaining tabs integrally formed on the retaining part.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

FIG. 11 shows an axial sectional view through a conventional commutator motor with a two-piece bearing bracket construction, having a noise damping part in between.

DETAILED DESCRIPTION OF THE PREFERRED EMBODIMENTS

Figure 1:
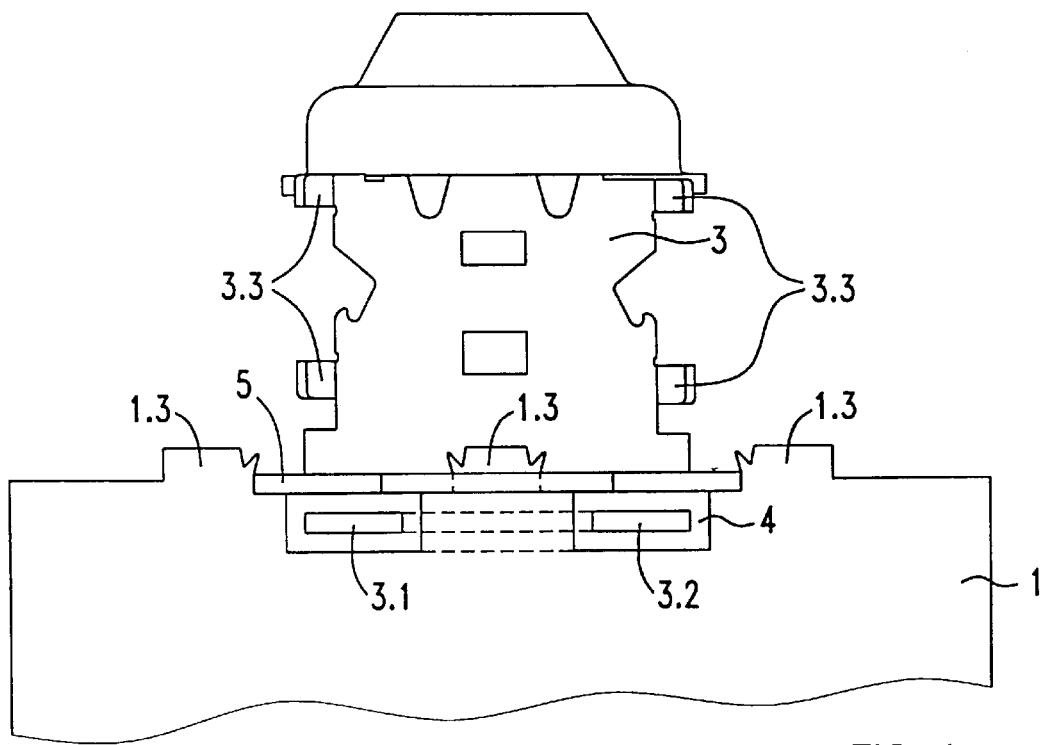
FIG. 1 shows a radial elevational view of a bearing end of an electric motor with a bearing bracket which is attached to the motor housing by peening and is noise dampended in accordance with the invention.

FIG. 11 shows a conventional commutator motor with a stator motor housing 1. The permanent field magnets 1.5 are held on its internal circumference and it has a rotor shaft 2 mounted in cup bearings 2.4 and 2.5 at both ends. A rotor core 2.1 is mounted on the rotor shaft 2 and has a rotor winding 2.2 connected to a commutator 2.3. On the stator side, the cup bearings 2.4 and 2.5 are held at both ends of the motor housing 1 by bearing brackets 3, which each comprise a first bearing bracket part 3A on the stator side and a second bearing bracket part 3B on the bearing side. The first and second bearing bracket parts 3A and 3B are connected to one another with a noise damping part 8 in between. This is achieved by the first bearing bracket part 3A and the second bearing bracket part 3B both having a preferably flat contact part with which they overlap, and by the noise damping part 8, which is also substantially flat, being held between these contact parts. The noise damping parts 8 are preferably made of an elastomer. The radially outer ends of the outer bearing bracket parts 3A are advantageously peened or welded to the ends of the motor housing 1. Hammer brush holders (not shown) which slide on the commutator 2.3 are mounted on the bearing bracket 3 such that they pivot between axial stops 3.3.

The invention and the manner in which it stops noise from the rotor side being transmitted through the bearing brackets 3 to the motor housing 1 are explained in the following text, with reference to FIGS. 1 to 10.

The bearing brackets 3 are mounted on the motor housing 1 as follows. At their radially outer ends, the bearing brackets 3 each have a retaining part 3.5 with two radially projecting retaining tabs 3.1 and 3.2 onto which pockets 4.1 and 4.2 of a noise damping part 4 are plugged in advance. These retaining tabs 3.1 and 3.2 are then inserted into axial end recesses 1.1 and 1.2 in the motor housing 1 and are fixed in position by a mounting part 5 which is thereafter connected to the end of the motor housing 1. The mounting part 5 thereby presses the bearing bracket 3 against the motor housing 1 by means of the retaining tabs 3.1 and 3.2. The retaining tabs 3.1 and 3.2, however, are retained within the noise damping part 4, to dampen the noise generated by the motor. To further dampen the noise, a connecting damping part 4.3 is provided between the rest of the circumferential bearing bracket part 4 and the motor housing 1. The pockets 4.1 and 4.2 in the damping part as well as the connecting damping part 4.3 are expediently joined together to form an integral noise damping part 4, which can be premounted on the bearing bracket 3 by pressing it onto the the retaining tabs 3.1 and 3.2.

FIG. 1 shows a common mounting part 5 fixed to the motor housing 1 by peening. This mounting part 5 presses against both retaining tabs 3.1 and 3.2 in a contact region 5.6 thereof, with the noise damping part 4 placed over them. To do this, the retaining tabs 3.1 and 3.2 are first inserted, with the noise damping part 4 placed over them, into the axial recesses 1.1 and 1.2 (shown in FIG. 9) in the motor housing. The mounting part 5 (see also FIG. 4) is then in contact with contact edges 1.4 of the motor housing 1 in a mounting region 5.5 of the mounting part 5. As seen in FIG. 1, peening tabs 1.3 are peened over the mounting regions 5.5 to fix the mounting part 5 against the motor housing 1.

Figure 2:
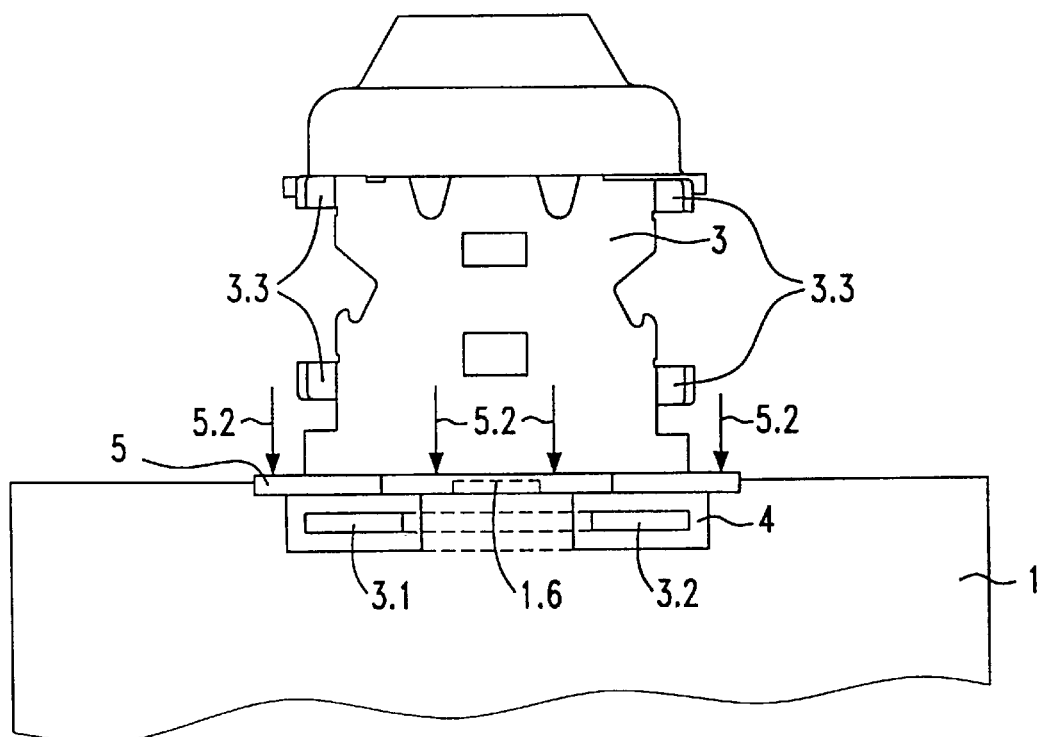
FIG. 2 shows a radial elevational view of a bearing end of an electric motor with a bearing bracket which is attached to the motor housing by welding and is noise dampended in accordance with the invention.
Figure 3:
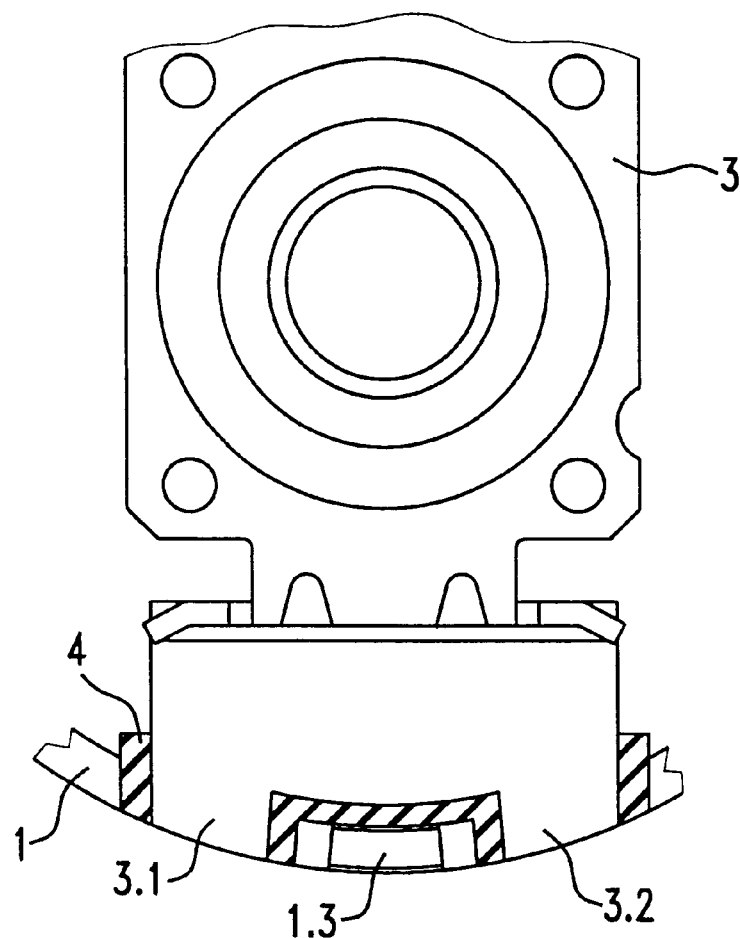
FIG. 3 shows an axial end elevational view of a bearing bracket which is in contact with the motor housing, and which has no mounting part, but has a premounted noise damping part.
Figure 9:
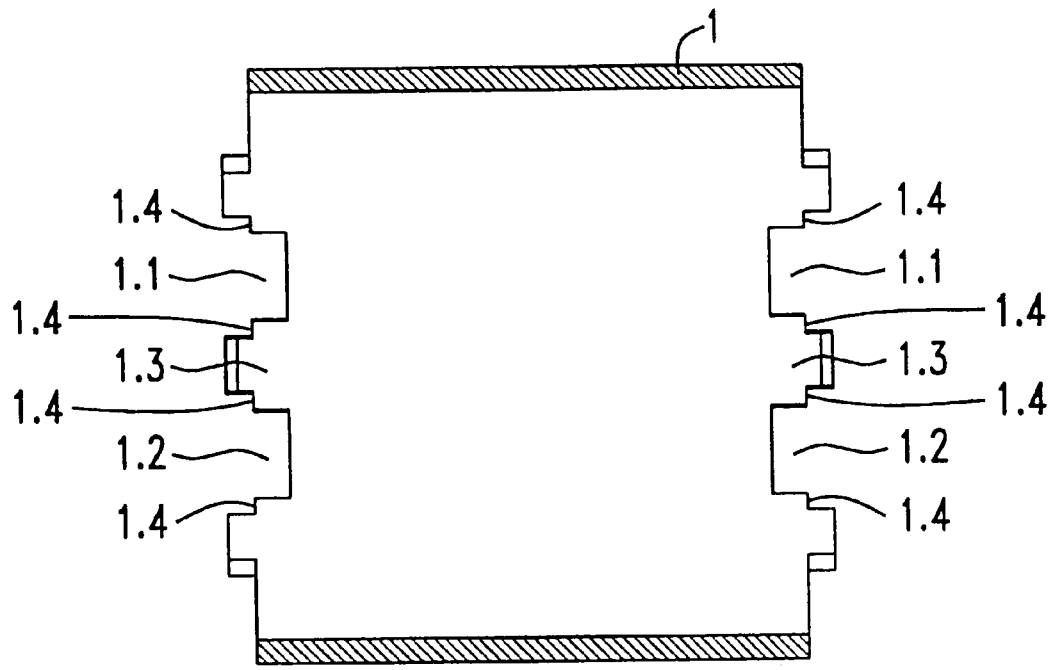
FIG. 9 shows a radial internal elevational view of a motor housing half before the components are fitted.
Figure 10:
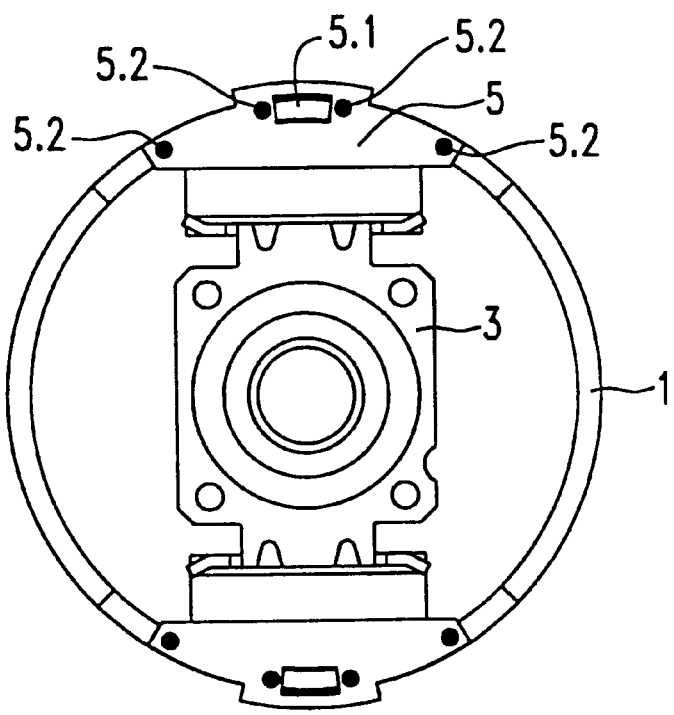
FIG. 10 shows an axial end elevational view of a motor housing with a bearing bracket held according to the invention.

As an alternative to the embodiment of FIG. 1 and FIG. 9, the mounting part 5 is fixed to the motor housing 1 by four spot welds 5.2 provided in the mounting regions 5.5, as shown in FIG. 2 and FIG. 10.

So that the noise damping parts 4 can be premounted in an advantageous manner on the bearing bracket 3 that is attached to the motor housing 1—as can be seen in particular in FIG. 5 to FIG. 8—the noise damping parts at each bearing bracket end are joined together as an integral unit. They also have pockets 4.1 and 4.2 formed in them and are matched to the retaining tabs 3.1 and 3.2 on the bearing brackets 3. These pockets 4.1 and 4.2 allow the noise damping parts 4 to be plugged onto the retaining tabs 3.1 and 3.2 easily, before the bearing mounting is mounted on the motor housing 1. This means that they can be fixed to the bearing mounting in advance.

Figure 4:
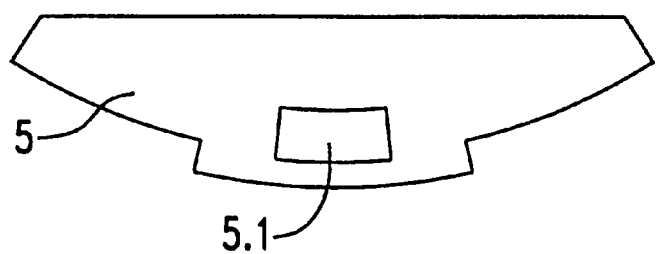
FIG. 4 shows an axial end elevational view of a mounting part.
Figure 5:
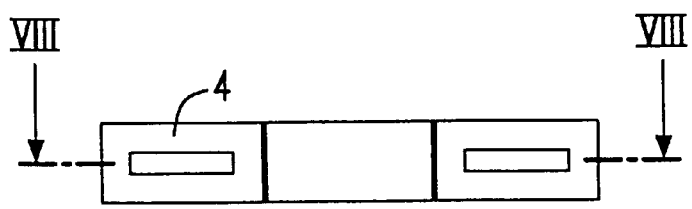
FIGS. 5–7 show a radial top elevational view, an axial elevational view and a radial elevational view from underneath a damping part, respectively.
Figure 6:
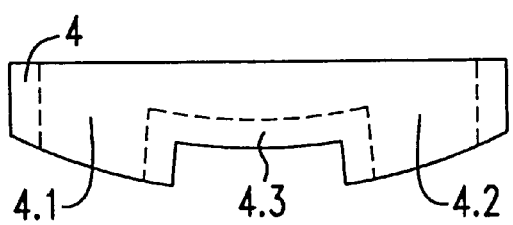
Figure 7:
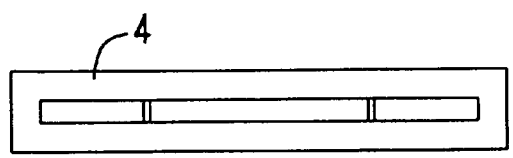
Figure 8:
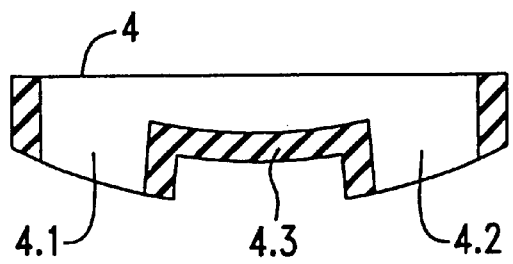
FIG. 8 shows a section along line VIII—VIII of the damping part according to FIG. 5.

As can be seen in particular in FIG. 4, the mounting part 5 has a guide opening 5.1 which makes it easier to align the mounting part 5 with the motor housing 1 and, according to FIG. 1, makes it possible to peen the central peening tab 1.3 over and between the two side retaining tabs 3.1 and 3.2. If a welding process is used, as in FIG. 2, a guide tab 1.6 on the motor housing 1 may be provided to ensure alignment, by engaging in the guide opening 5.1 in the mounting part 5.

The rotor is mounted in the motor housing 1 via a rotor shaft 2 (see FIG. 11), cup bearings 2.4 and 2.5 (see FIG 11) and the bearing brackets 3. To ensure that the flush alignment is particularly accurate, once the rotor has been fitted with the bearings and the bearing brackets, the rotor can be held aligned relative to the motor housing in an apparatus and the mounting parts can be fixed on the motor housing in this mutually aligned arrangement. The mutual alignment of the rotor and stator is then ensured by appropriate contact pressure and by the retaining tabs being held in a positively locked manner in the respective recesses in the motor housing.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A low-noise electric motor, comprising:
   a motor housing;
   at least one bearing holder mounted on said motor housing;
   a noise damping part interposed directly between said motor housing and said bearing holder in a region in which said bearing holder is mounted to said motor housing; and
   at least one mounting part fixing said bearing holder on said motor housing via said noise damping part, wherein said mounting part is connected with direct contact to said motor housing.

2. The low-noise electric motor as claimed claim 1, wherein said bearing holder is a bearing bracket.

3. The low-noise electric motor as claimed claim 1, wherein said mounting part is a mounting plate.

4. The low-noise electric motor as claimed claim 1, wherein said mounting part presses said bearing holder against said motor housing via said noise damping part.

5. The low-noise electric motor as claimed in claim 4, wherein said mounting part has a contact region that presses said bearing holder against said motor housing via said noise damping part, and has a mounting region that is in direct contact with said motor housing without interposition of said noise damping part.

6. The low-noise electric motor as claimed in claim 1, wherein said noise damping part is made of an elastomer.

7. The low-noise electric motor as claimed in claim 1, wherein said bearing holder is formed at least substantially of sheet-metal and comprises a retaining part in the region in which said bearing holder is mounted to said motor housing, said retaining part having at least one integrally formed sheet-metal retaining tab.

8. The low-noise electric motor as claimed in claim 7, wherein said noise damping part is formed as a sleeve engaged over said retaining tab.

9. The low-noise electric motor as claimed in claim 1, wherein said mounting part is connected to said motor housing by means of a peened joint.

10. The low-noise electric motor as claimed in claim 1, wherein said mounting part is connected to said motor housing by means of a welded joint.

11. The low-noise electric motor as claimed in claim 1, wherein:

said bearing holder comprises a retaining part in the region in which said bearing holder is mounted to said motor housing, said retaining part having at least one retaining tab integrally formed with said retaining part;

said motor housing comprises at least one recess configured to receive said retaining tab; and said mounting part engages over the recess with said retaining tab inserted into the recess.

12. The low-noise electric motor as claimed in claim 11, wherein the recess extends axially into said motor housing and said mounting part engages over the recess at an axial end surface of said motor housing.

13. The low-noise electric motor as claimed in claim 11, wherein said noise damping part is formed as a sleeve engaged over said retaining tab in the recess.

14. The low-noise electric motor as claimed in claim 13, wherein:

said retaining part is provided on a circumferential end of said bearing holder;

said retaining part comprises at least two said retaining tabs projecting from and spaced apart from each other on said circumferential end, said retaining tabs being integral with said circumferential end;

said noise damping part has pockets into which said retaining tabs are respectively plugged and has a noise-damping connecting part provided between the pockets.

15. A low-noise electric motor, comprising:

a motor housing;

at least one bearing holder mounted on said motor housing;

a noise damping part interposed between said motor housing and said bearing holder in a region in which said bearing holder is mounted to said motor housing; and at least one mounting part fixing said bearing holder on said motor housing via said noise damping part, wherein said mounting part is connected with direct contact to said motor housing;

wherein said mounting part presses said bearing holder against said motor housing via said noise damping part.

16. The low-noise electric motor as claimed in claim 15, wherein said mounting part has a contact region that presses said bearing holder against said motor housing via said noise damping part, and has a mounting region that is in direct contact with said motor housing without interposition of said noise damping part.

17. The low-noise electric motor as claimed in claim 15, wherein:

said bearing holder comprises at least one retaining tab; and said noise damping part is formed as a sleeve engaged over said retaining tab.

* * * * *